Feb. 17, 1953  E. W. ADAMS, JR  2,628,881
RECORDING METHOD
Filed July 5, 1944
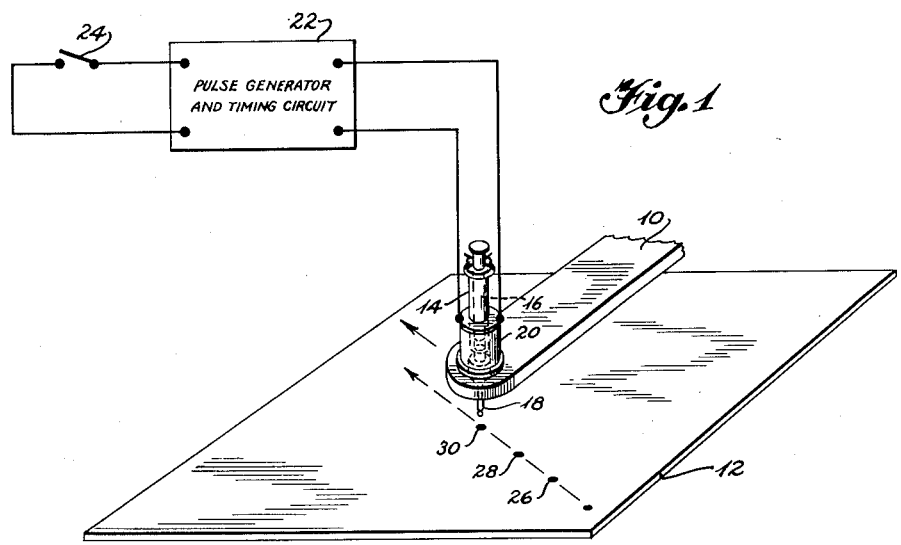
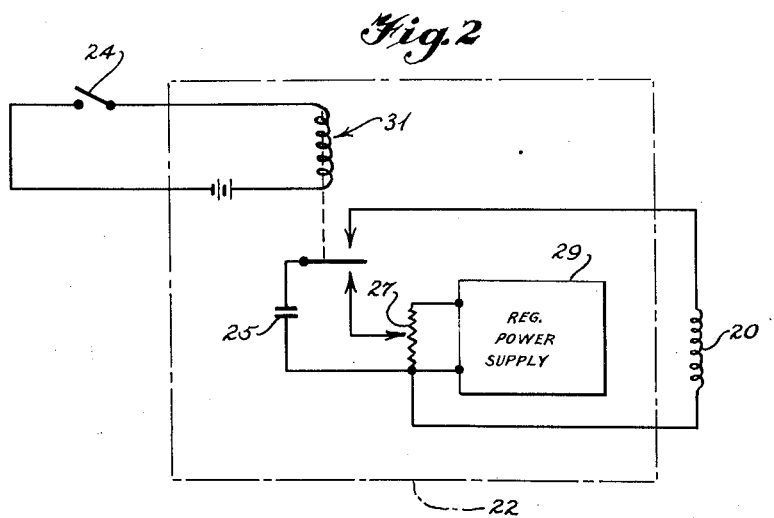
INVENTOR.
Edgar W. Adams, Jr.
BY
attorneys Patented Feb. 17, 1953

2,628,881

UNITED STATES PATENT OFFICE 2,628,881

RECORDING METHOD

Edgar W. Adams, Jr., Garden City, N. Y., assignor to the United States of America as represented by the Secretary of the Navy Application July 5, 1944, Serial No. 543,586

1 Claim. (Cl. 346—1)

This invention relates to recording methods for use with remote indicating systems of the type in which a moving index is arranged continuously to impart information concerning the operation of a remotely located mechanism.

In such indicating systems, means are often provided for making a permanent record of the motion of the moving index. It may, however, be desirable in some cases to record the position of the index only at chosen times. In such cases, it has heretofore been usual to use a permanent record as provided by an ink writer or a spark recorder, for example, or a momentary record such as that provided by means of a flashing light.

When remote indicating systems of this general type are used for training purposes or experimental work, it may be preferable to provide temporary indications of the position of the moving index at chosen times, these indications being arranged to disappear without trace after a finite time has elapsed.

In one particular application, for example, the invention is used in a training system for pilots, including a scale model aircraft which is hidden from the pilot's view and may be remotely controlled by him for symbolic flight over a simulated maneuver area in which there is located a model of a tactical objective. There is also included a remote-indicating system comprising a second model of the maneuver area and an index representing the aircraft in full view of the pilot from his control position, this remote-indicating system serving to acquaint the pilot with the position of the scale model aircraft in the maneuver area. In actual maneuvers, the pilot can drop a series of flares to mark his instantaneous position in the area at a particular time, each of these flares being effective for a limited time. In the trainer, therefore, the pilot must be enabled not only to control the motion of the scale model aircraft in the maneuver area (and thus to control the remote-indicating system), but also to simulate successively dropped marker flares, each of which must disappear from view in the order dropped after a chosen time interval. It is proposed, in accordance with the present invention, to use drops of volatile fluid deposited on a plane surface as indicators of the position of the traveling index. The volatility of the fluid and the size of the drops used are chosen to provide indications which have the desired duration and which disappear as the fluid evaporates. Thus, successively deposited indicators disappear in turn as the indication time of each expires.

Preferably, the indicator drops are deposited on an opaque or translucent surface, as for example opal glass. They may then be rendered visible by means of a lamp arranged to floodlight the plane surface. The individual indicator drops serve to focus such a light source to provide pinpoint illumination of the plane surface substantially beneath the drops, thereby indicating their positions.

Conveniently, the indicator drops are formed by means of a dropper comprising a conventional glass hypodermic syringe, the needle of which is ground off flat normal to its axis to insure production of drops of readily controllable size. This syringe may be provided with a plunger of magnetic material which may be actuated by means of a solenoidal coil, through which a current pulse may be passed, wound on the glass barrel of the syringe. The size of the drops deposited by this type of dropper may, for a given fluid, be controlled to provide indications having durations varying over a considerable range by adjusting the magnitude and duration of the current pulse supplied to the actuating solenoid.

One device for practicing the method of the invention is shown in Fig. 1 of the attached drawings; and Fig. 2 is a simple illustrative control circuit.

A remote-indicating-system index 10 is movable in respect to an indication plane 12. A conventional hypodermic syringe 14 is mounted on index 10 and is provided with a plunger 16 of magnetic material. Needle 18 of the syringe extends through index 10 and its end is ground off normal to its axis to assure formation of uniform drops for a given displacement of plunger 16.

Displacements of plunger 16 are effected at chosen instants by means of solenoid 20, through which a pulse generated by pulse generator and timing circuit 22 is passed, whenever control key 24 is closed. Solenoid 20 in one instance comprised 1000 turns of B. and S. No. 34 copper wire, wound on a brass form surrounding the barrel of syringe 14.

The pulse generator and timing circuit may conveniently include capacitor 25 which is charged through potentiometer 27 from a regulated power supply 29. The setting of the potentiometer regulates the potential applied to the capacitor, and thus the size of the pulse applied to solenoid 20. Suitable relaying circuits (indicated by arrow 31) controlled by key 24 may be employed to discharge the capacitor of the pulse generator and timing circuit at a chosen instant and to recharge the capacitor for another cycle of operation.

In the case illustrated in the accompanying drawing, rectilinear motion of index 10 in the direction of the arrow is assumed, and deposited drops 26, 28 and 30 indicate the positions occupied by the index at previous instants chosen by the operator of the remotely controlled system with which the indication system is associated. It will be recognized that, if drops 26, 28 and 30 were of equal size when deposited, they will disappear through evaporation in the same order in which they were deposited.

The choice of volatile fluid used depends, to a large extent, upon the desired durations of indication and upon the permissible size of indicator marks. In one case, distilled water was used and indicator marks of reasonable size were obtained which, depending upon the setting of the potentiometer of pulse generator and timing circuit 22, had indication durations ranging from three to twelve minutes.

What is claimed is:

The method of making temporary indications of instant positions of a movable index comprising the steps of; predetermining the size of and forming drops of volatile transparent fluid, depositing a drop on an indicating surface at each instant position of the index after selecting each instant position, exposing the drops of fluid to free atmospheric air for normal evaporation so that the desired duration of existence of the drops is obtained by selection of the size of drops, and focusing illumination in the drops on said surface by illuminating said surface.

EDGAR W. ADAMS, Jr.

REFERENCES CITED

The following references are of record in the file of this patent:

UNITED STATES PATENTS

| Number | Name | Date |
|---|---|---|
| 433,167 | Glover | July 29, 1890 |
| 1,841,452 | Ranger | Jan. 19, 1932 |
| 2,103,851 | Jones et al. | Dec. 28, 1937 |
| 2,103,868 | Perry | Dec. 28, 1937 |
| 2,108,559 | Jones et al. | Feb. 15, 1938 |
| 2,210,565 | Asher | Aug. 6, 1940 |
| 2,319,898 | Zurian | May 25, 1943 |